United States Patent Office 3,441,675

Patented Apr. 29, 1969

3,441,675

DIAL PULSE DETECTING SYSTEM

Henri Benmussa, Meudon, and Pierre Rene Louis Marty and Stanislas Kobus, Paris, France, assignors to International Standard Electric Corporation, New York, N.Y., a corporation of Delaware Filed Nov. 20, 1964, Ser. No. 412,621
Claims priority, application France, Nov. 20, 1963, 954,411
Int. Cl. H04m 3/46
U.S. Cl. 179—16 4 Claims

ABSTRACT OF THE DISCLOSURE

A dial pulse detecting system for distinguishing between dial pulses and noise. Detection is made by comparing the time length of the received pulses with a standard time interval. If the pulses or the intervals between pulses are of too long duration, they are known to be undesirable and are not used further. Pulses of the proper length are routed through the system.

The present invention relates to selection systems for circuits applicable to automatic switching telephone exchanges.

In prior art such as is shown in U.S. Pat. No. 3,242,-265, which issued on Mar. 22, 1966, and is assigned to the assignee of this invention, electromechanical switching apparatus is used for the conversation circuit and electronic components such as diodes and transistors for the control and supervisory circuits.

The local junctor inserted between the two selection chains—calling side and called party side—has as its main functions: sending of tones and of ringing current, supplying of current to the subscribers' sets; and maintaining both chains in a seized condition. The local junctor comprises the line wires, the relays which connect the various tone generators, as well as the ringing current generator and the current relays; the other functions normally accomplished by the junctor are distributed through the common equipment comprised of electronic components. A certain number of memories, made up of ferrite cores are assigned to every junctor; there is found, in particular, a shift register arrangement whose position characterizes the stage of operation, as well as elements for memorizing the conditions of the subscribers' lines (line opened or looped). A logic circuit, common to a group of junctors, scans in succession the said junctors as well as the cores which are associated with them. At each stage of operation the logic circuit takes note of the information given by the memories and by the contacts of the various relays; it draws all useful conclusions, commands the necessary operations and then it brings the memories up to date. Since the different junctors are scanned in a cyclical manner, the same logic circuit operates in succession for each one of them according to a "time division multiplex system."

The orders elaborated by the logic circuit are consigned to an intermediate memory until needed, that is after the operation of certain relays. This memory can be common to several junctors, and is called the "control register."

The outgoing and incoming junctors are designed according to the same principle as the local junctors; and it is possible to find inside a group served by a same logic circuit: local junctors, outgoing junctors and incoming junctors.

In certain prior art systems the junctors are not equipped with individual sets of cores as in the foregoing case. When a junctor is in service, there is temporarily assigned to it an arrangement of cores or "memory compartment" by having its number written in this compartment; this results in an economical use of the entire arrangement of cores. When the logic circuit scans the compartment by means of a first scanner, it reads the number of the junctor and directs a second scanner onto this junctor. It is then able to assemble all the information elements necessary for making a decision. The various memory compartments are grouped into "blocks" and scanned one after the other in cyclical manner, yet the junctors are scanned at the request of the logic circuit according to numbers read in the memory compartments.

In another prior art system, such as shown in U.S. Pat. No. 3,378,818 which issued on Apr. 16, 1968 and is assigned to the assignee of this invention, a memory block is provided to serve a group of junctors having a determined traffic load. An individual logic circuit, particular to each block, scans in cyclical manner the various compartments of the block, but it only performs simple operations such as the re-writing of the information read. In the complicated cases, it refers to a central logic circuit, common to all the blocks, which stops the scanning and effects what is necessary. Thus, a saving in equipment is realized while still conserving a reasonable duration for the scanning cycle.

In the prior art systems difficulties occurred concerning the detection of the dial impulses, originated by the dials of the telephone sets. Because of the existence of phenomena such as parasitic noises and contact bounces, several successive observations as to condition of the calling line were necessary before concluding with certainty that it was a dialing impulse or an interval between impulses.

Accordingly, an object of this invention is to provide detecting-of-dial-impulses devices, simple, economical and reliable in operation.

According to one feature of the invention, when there is a change in line condition liable to constitute a beginning of dial impulses, a time-limit cam system, for example, a cam to control the operation of a bistable circuit is put into service. The change in condition is interpreted as being an impulse only when its time-duration is less than a predetermined time period. When there is another change of condition liable to constitute an interval between impulses, the said change is only interpreted as an interval when its time duration is less than a predetermined time period.

Another feature of the invention is to use a time-limit cam giving recurrent impulses, and to store in a memory the first one of these impulses which follows a change of line condition; the said change is interpreted as a dialing impulse, or an interval between impulses only if another change occurs before the cam generates a second impulse.

According to another feature of the invention, the time-duration of the cycles of the cam generated impulses coincide with a scanning cycle of all the memory compartments of a block, so that when this impulse is produced it is found, once, and only once, per scanning period.

Another feature of the invention is the provision of means to current-feed the calling party through a system of resistors and inductances, and means to detect the line conditions by means of potentials tapped from one or several points in the current-supply circuit, and means to eliminate all the changes of conditions whose time-duration is less than a predetermined limit.

According to another feature of the invention, when the individual logic circuit scans a memory compartment and junctor with which it is temporarily associated, it reads the previous condition of the line in the memory compartment and the present condition of the said line-by means of the potential tapped from the current supply circuit. If it notes that a change in condition has occurred since the last scanning operation, it consigns this new condition into the memory compartment and calls for the central logic circuit by communicating to it all useful information. The said central logic circuit controls the input to the memory compartment, of an indication that corresponds to the pulse of the cam.

According to another feature of the invention, when the individual logic circuit scans the memory compartment again and finds the "cam display" or the monitoring of the cam actuated bistable circuit output while this cam is generating an impulse from the bistable circuit, it calls the central logic circuit by communicating to it all useful information. The central logic circuit then notes the first cam-current generating period in the memory compartment.

According to another feature of the invention when the individual logic circuit notices a new change in condition of the line it calls the central logic circuit, indicating to it the old and new condition of line. The said central logic circuit then interprets this change, according to cases, either as an end of a dial-impulse or as the end of an interval between impulses.

According to another feature of the invention, when the individual logic circuit by scanning the memory compartment finds at the same time the indications: "cam display," "first cam impulse received," and notices at the same time the presence of a second cam impulse, it calls the central logic circuit by transmitting to it all this information, as well as the condition of the line. The said central logic circuit interprets this state as a caller's replacing of a handset in case the line is open; or, interprets it as a pause marking the end of a number in case the line is looped.

According to a variant, another feature of the invention is to use two cams, set apart one as to the other, and to give to the pulse of the first cam a time period slightly longer than the time period of the scanning cycle of the memory compartments of a block. In order to find this impulse with certainty whatever be the compartment scanned, this impulse being written once and once only in the memory compartment and a line condition, existing during this writing operation, being only interpreted as a dialing impulse or interval between impulses, if it disappears before the reception of an impulse from the second cam.

The above mentioned and other objects and features of the invention will become apparent from the description that follows, given by way of nonlimiting example in conjunction with the accompanying drawings comprising FIGS. 1 to 5, wherein.

Figure 1:
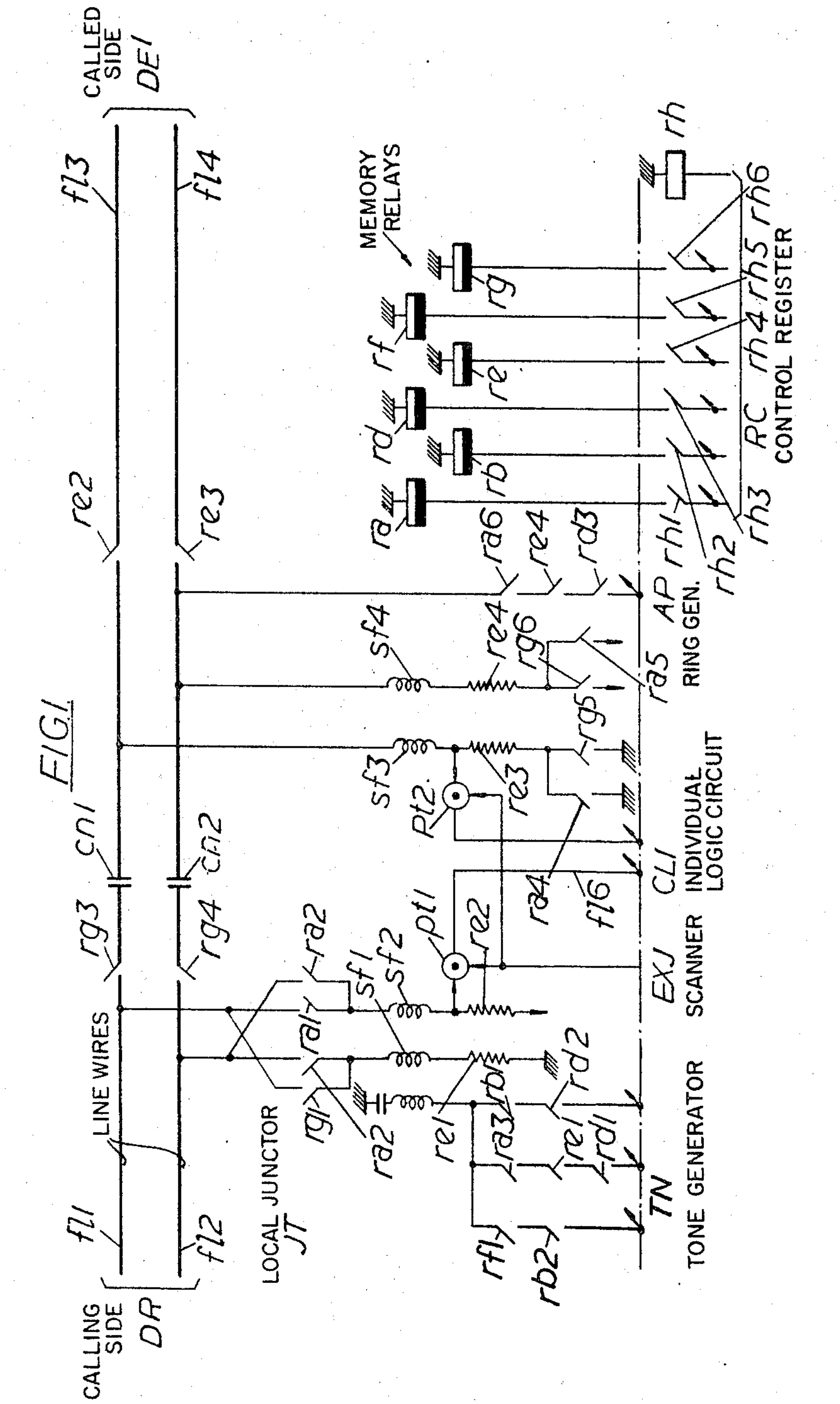
FIGURE 1 shows the circuit elements of a local junctor or simplified junctor.

Symbols.—The memory relays, which are maintained operated by remanence after the energizing current is removed are represented by a small rectangle with a black strip on its lower half (relays *ra* to *rg*, FIG. 1). The relay contacts are shown by the same symbol-reference as the corresponding relay and followed by one of the numbers 1 to 9.

Figure 2:
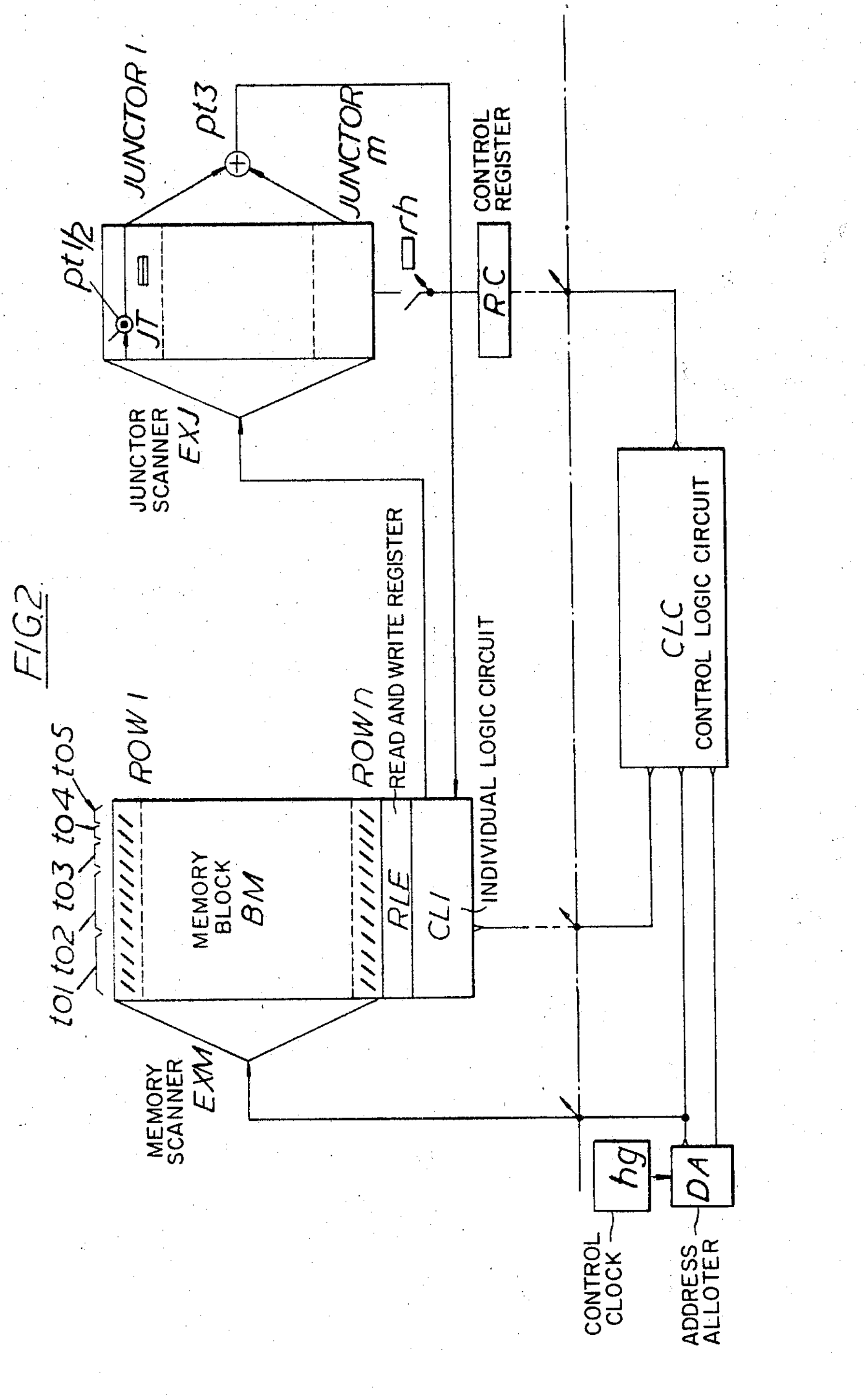
FIGURE 2 is a block diagram of a semi-electronic telephone system relating to the "Junctors and registers" part.

The ferrite cores provided for storing of binary information or bits are shown by small oblique strokes (cores *to*1 to *to*5, FIG. 2). The cores temporarily assigned to a junctor, make up a memory compartment and are set in a same horizontal line.

The electronic scanners are shown by a triangle (EXM, EXJ). The gates "OR" are shown by a circle with a cross in it (notation inspired by Boole's algebra).

The bistable circuits, such as *tm* (FIG. 3), are represented by two juxtaposed rectangles bearing the numbers 1 and 0. The incoming wires are placed at the upper part and have an arrow showing the incoming direction of the signal; the outgoing wires *tm*1 and *tm*0 are placed at the lower part. Normally, this bistable is in position 0, a characteristic potential, such as −12 v., being applied onto wire *tm*0. To cause the bistable to pass onto position 1, a control signal is applied onto the left incoming wire, the characteristic potential passes then from wire *tm*0 onto wire *tm*1. To bring the bistable back into its initial position, a control signal is applied onto the right incoming wire. A similar representation is used for the other bistable circuits.

Finally, the amplifiers are represented, as is currently done, by small triangles (*ap*1, *ap*2, *ap*3).

General layout of the equipments.—In the local junctor JT, in FIG. 1, there are found: the calling line wires *fl*1, *fl*2; the conversation condensers *cn*1, *cn*2; and the called line wires *fl*3, *fl*4. Conventional current supply relays have not been provided. The calling subscriber is current-supplied through resistors *re*1, *re*2 and inductances *sf*1, *sf*2; the called subscriber is current-fed through resistors *re*3, *re*4 and inductances *sf*3, *sf*4. The presence or absence of the loop, calling side is detected by the value of the potential between resistor *re*2 and self inductance *sf*2. The corresponding information is transmitted to the individual logic circuit CLI when the scanner EXJ gets in front of the junctor considered and unblocks the "AND" gate *pt*1. The point of interest in this arrangement is the elimination of disadvantages due to bounces of relay contacts; moreover, the parasitic noises are filtered by the self inductance *sf*2. A similar process is used for detecting the presence or absence of a loop on the called-party side.

The memory relays *ra* to *rg* are provided for putting the current-supplying relays into service and for sending the tones and ringing current. Their respective functions are as follows:

(a) Supplying incoming current to the calling-party before a reply is received from the called-party: a relay *ra* (contacts *ra*1 and *ra*2):

(b) Transmitting the dial signal by the tone generator TN: relays *ra, rb, rf* (contacts *rb*2, *rf*1, *ra*2);

(c) Transmitting the ringing current provided the generator AP: relays *ra, rd, re* (contacts *rd*3, *re*4, *ra*6); ringing tone by *rd*1, *re*1, *ra*3;

(d) Replying to the answer by the called-party and establishing of the conversation circuit: relays *re, rg,* (contacts *rg*1, *rg*2, *rg*3, *rg*4, *rg*5, *rg*6,*re*2, *re*3);

(e) Sending the busy tone if the called-party is not free: relays *ra, rb, rd* (contacts *rd*2, *rb*1, *ra*2).

To each junctor in service, there is temporarily assigned a compartment of the memory block BM (FIG. 2). In each one of them there is found a certain number of ferrite cores. The cores *to*1 are provided to note the number of the junctor associated with the compartment. The cores *to*2 indicate the stage of operation and constitute the shift register. The cores *to*3 are used for storing the line conditions of the calling and called parties (line open or looped). The core *to*4 displays the time-limit cam necessary for the detection of the dialing impulses and the core *to*5 stores the first cam-current-generating period. A memory block is provided for each group of *m* junctors. Every block contains a number of compartments *n* inferior to the number of junctors, so as to efficiently use the full set of cores. These compartments can be assigned either to local junctors, or to outgoing junctors, or to incoming junctors. As an example, it is possible to make up groups of 384 junctors, corresponding approximately to a traffic of 2000 lines, and memory blocks of 250 compartments.

A second compartment of the memory block BM is temporarily assigned to a junctor for registering the digits dialed by the calling subscriber. This compartment is used only during call-establishing period, and it can then be released.

To scan the various compartments of the memory block BM, an address allotter DA is available. It is essentially made up of a chain of several binary counters, each one of them causing the next one to step forward by one step when it restores to rest condition.

In such conditions, it is possible to obtain $2^n$ combinations by using only $n$ binary counters. Impulses *hg*, originating from a central clock, take care of the advancing of the first counter of the chain. The binary indications delivered by the address allotter DA are de-coded through any well-known and currently used means, such as diode matrices or resistor matrices, so as to make appear a characteristic potential upon one well determined wire, and one only, for every position of the address allotter. This decoding device constitutes the scanner EXM.

The function of the reading and writing equipment RLE consists in displaying, upon bistable registers for instance, the items of information read upon the compartments of the memory block BM, as well as the items that have to be written upon these same compartments.

The individual logic circuit CLI, associated with each memory block, has only a simplified function. It merely assembles the various items of information given by a memory compartment and the associated junctor. It can only perform simple operations such as the rewriting of the information read. In the more complicated cases, it refers to the central logic circuit CLC. The individual logic circuit CLI may have access to each of the junctors in the group by means of a scanner EXJ constituted like EXM; it simply has to read the junctor number displayed upon RLE and to send the corresponding code upon EXJ.

For each one of the junctors JT there is shown, in FIG. 2, one of the gates enabling to know the subscriber line conditions, as well as a memory relay.

The central logic circuit CLC is common to all the memory blocks of the central-exchange. Of course, it may be duplicated for reliability purposes. Its function is to handle all the complex cases. The orders elaborated by this circuit are stored in an intermediary memory or control register RC up to the instant where the corresponding memoy relay has indeed operated. The control register serves several junctors and may have access to each one of them through the contacts of relay *rh*. This relay is found in FIG. 1.

General operating process.—The different compartments of the memory block BM are scanned in cyclical manner by the scanner EXM. Since the address allotter DA, sending the codes onto EXM, is common to the scanners of the various memory blocks, all the scanners step forward in synchronism. When EXM reaches the level of a determined compartment of the memory block BM—for instance compartment 1—the contents of this compartment is displayed on the reading and writing register RLE. The individual logic circuit CLI begins by taking notice of the junctor number written on the cores *to*1; it consequently directs the junctor scanner EXJ to send signals onto the gates *pt*1, *pt*2 associated with the subscribers' lines. If the line is looped, the corresponding gate is unblocked and the signal returns to the individual logic circuit CLI through the "OR" gate *pt*3. If the line is open, the gate is blocked and the individual logic circuit receives nothing. For each subscriber (calling and called party) the individual logic circuit compares the present condition of the line, given by the junctor, with the previous condition of this line written on the cores *to*2. If it ascertains that there is no change whatsoever, and if there does not exist any particular instruction written on the cores *to*4, *to*5, it just confines itself to simply rewriting the information read. Then the scanner EXM advances onto the next compartment.

When the individual logic circuit CLI notices a change in the condition of one of the subscribers lines, or if it finds a particular instruction on the cores *to*4, *to*5, it calls for the central logic circuit CLC. The latter sends an adequate command to the address allotter DA in order to stop the cyclical scanning; and it connects onto the individual circuit CLI. It then takes note of all the information given by this circuit, then it provides the necessary orders. Thus, for instance, if it ascertains that the sequential or shift register is on the position which corresponds to the first stage of operation, it causes, through the medium of the control register RC, the energization of relay *ra* (FIG. 1) so as to send the supply current onto the calling subscriber's line. At the next stage of operation, the individual logic circuit ascertains that calling line, previously opened, is now looped. The central logic circuit is recalled and commands the energization of both relays *rb* and *rf* so as to send the dialing signal to the calling subscriber. Of course, the central logic circuit, after having provided an order, transmits to the control register not only this order but the junctor number, so as to enable the energizing of the corresponding relay *rh*.

It may happen that several individual logic circuits CLI (FIG. 2) simultaneously call the central logic circuit CLC. The latter stops the cyclical scanning, as in the preceding case, then it serves in succession each of them in a predetermined order; then the cyclical scanning starts once more.

In the absence of special precautions there would be a memory block scanning cycle of variable duration, which would depend upon the number of stops requested by the central logic circuit and upon the duration of each one of them. In practice, it is convenient to use a scanning cycle of constant length. For that purpose, it is just necessary to provide a time duration largely sufficient to allow for the functioning of the central logic circuit and to arrange for a dead period of time at the end of the cycle, in order to obtain the result desired. Such an arrangement is described in detail in the second patent mentioned in the preamble.

Figure 3:
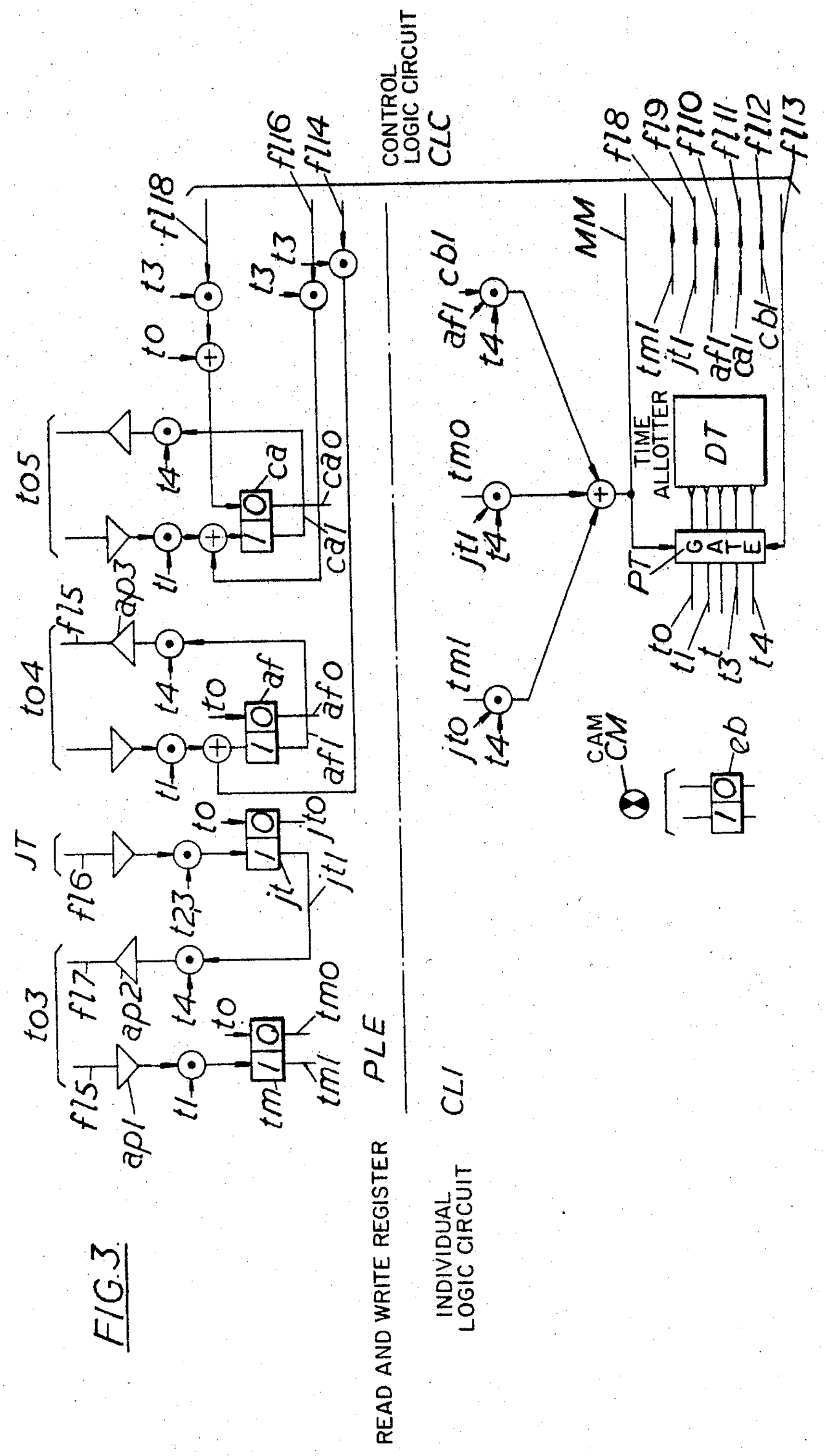
FIGURE 3 shows the circuit elements of the reading and writing register, and of the individual logic circuit, necessary for understanding the present invention.

Detecting a dialing impulse.—In FIG. 3 are shown the elements of the reading and writing register RLE and of the individual logic circuit CLI which enable to better understand the detecting process of a dialing impulse as per the present invention.

Figure 4:
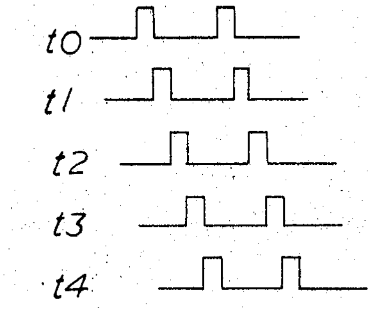
FIGURE 4 is the diagram of the controlling impulses supplied by the time allotter.

During the scanning of each one of the memory compartments, a time scanner DT originates impulses *t*0 to *t*4 for the control of the various elementary operations. The diagram of these impulses is shown in FIG. 4. The instant which corresponds to impulse *t*0 is used for the setting of the address allotter and of the scanner into position; it is also used to reset the reading and writing bistables. The instant *t*1 is assigned to the reading of the cores of the memory compartment. The instants *t*2 and *t*3 are used for the reading of the information given by the junctor. Finally, the instant *t*4 is used for the rewriting of the information upon the cores of the memory compartment and for the logic operations. In practice, it is possible to use 20 microseconds for scanning each memory compartment; thus, the duration of each one of the impulses *t*0 . . . *t*4 is four microseconds. These impulses are delivered by the scanner DT under control of gates PT.

During the first stage of operation, that is to say before the beginning of the dialing impulse, the calling subscriber's line which had been found looped during the foregoing scanning operation, is still in looped condition when the scanner once again reaches the memory compartment considered. This corresponds to the point P1 in FIG. 5. It will be assumed that gates PT are open, enabling the passage of control impulses *t*0 to *t*4.

At the instant *t*0, the reading and writing bistables *tm*, *jt*, *af*, *ca* are restored to zero by the corresponding control impulse.

Since the caller's line is looped during the foregoing scanning operation, the corresponding core *to*3 is in position 1, therefore, a signal appears on reading wire *fl*5. This signal is amplified by *ap*1 and acts upon the bistable *tm* through a gate "AND" unblocked by the impulse *t*1. This bistable passes to position 1.

At the instants *t*2 and *t*3, the individual logic circuit takes note of the junctor number under consideration and consequently directs the scanner to this junctor, in order to detect the present condition of the calling line. This line is still looped so a signal is received on wire *fl*6 which causes the bistable *jt* to pass to position 1.

At the instant *t*4, there is written on the core *to*3 the present condition of the line, that is to say the condition "1" supplied by the bistable *jt*. The corresponding information is transmitted through a gate "AND" unblocked by impulse *t*4 through amplifier *ap*2 and wire *fl*7. The first stage of operation is terminated and the scanner steps forward upon the next memory compartment.

At the second stage of operation the dialing impulse originating from the calling subscriber's set is already started. That corresponds to point P2 of FIG. 5. As in the foregoing case, first the bistables are reset, then the reading of the prior condition and of the present condition of the line is read. This line being previously looped, the core *to*3 happens to be in the 1 condition, and the bistable *tm* passes to the condition 1. The impulse is started, the line is presently opened and the bistable *jt* remains in the 0 conditions.

At the instant *t*4, an item of information corresponding to the present condition of the line, that is to say an "0" is written on the core *to*3. At the same time, a signal is sent along calling wire MM of the central logic circuit CLC through a gate "OR" and a gate "AND" unblocked by the conditions *t*4, *jt*0 and *tm*1. This signal also causes the blocking of the gates PT in order to inhibit the control impulses *t*0 to *t*4. The condition of bistables *tm* and *jt* are not changed at this time.

The central logic circuit CLC stops the cyclical scanning. It serves other blocks of memory, if need be, and then connects onto the individual logic circuit CLI. By means of wires *fl*8 and *fl*9, it takes note of the condition of the bistables *tm*, *jt* and ascertains thus the beginning of the dialing impulse. By means of wire *fl*13, the central logic circuit acts upon the gates PT to renew the control impulses *t*2 to *t*4; by means of: the wire *fl*14, a gate "AND" unblocked by the signal *t*3 and a gate "OR", switching the bistable *af* to condition 1. At the instant *t*4, the condition of this bistable is transmitted onto core *to*4 through a gate "AND" unblocked by: the signal *t*4, the amplifier *ap*3 and the wire *fl*15. The writing of a "1" upon core *to*4 corresponds to the displaying of the time-limit cam. The central logic circuit CLC serves other blocks, when needed, and then commands the setting into operation again of the cyclical scanning.

Figure 5:
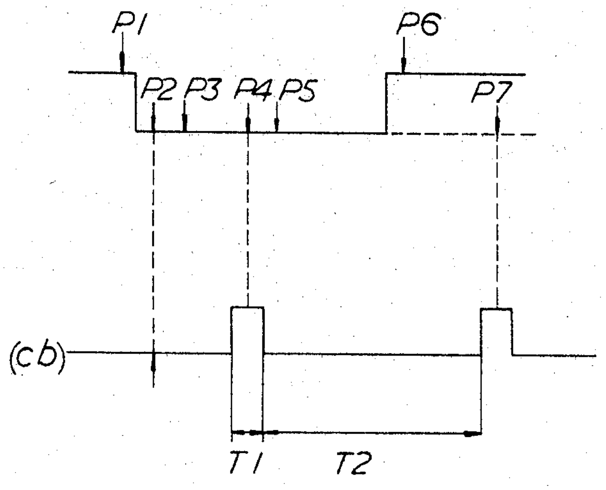
FIGURE 5 shows the diagram of a dialing impulse originating from a subscribers' telephone set, as well as the diagram of the impulses originated by the time-limit cam.

The time-limit cam CM controls the operation of the bistable *cb*. It is made up in such a way that this bistable happens to be in position 1 during the time T1, and in position 0 during the time T2 (FIG. 5). By convention, one will say that the time T1 corresponds to the cam-passing. The time T1 plus T2 coincides exactly with the duration of a cycle of the address allotter; it may start, for instance, at the beginning of the scanning of the first memory compartment of the block, and end when the scanning of the last memory compartment is terminated. In such conditions, one is sure to find a cam-passing period once, and find it once only. In practice, the following values can be chosen for T1 and T2:

| | Milliseconds |
|---|---|
| T1 | 10 |
| T2 | 70 |

At the third stage of operation, that is to say between the display or the monitoring of the cam actuated bistable and the first cam-passing period (point P3 of FIG. 5), core *to*3 is read to determine the present condition of the line in the junctor JT and the core *to*4. At the instant *t*4, the present condition of the line is rewritten upon the core *to*3 and the information condition 1 is placed in the core *to*4.

At the fourth stage of operation which corresponds to point P4 of FIG. 5, the passing of the cam takes place for the first time since putting display-core *to*4 into condition "1". As in the preceding stages, the reading and writing operations are being performed; but, since bistable *cb* happens to be in position 1, the central logic circuit CLC is called once more through a gate "OR" and a gate "AND" unblocked by the conditions *t*4, *af*1, *cb*1.

The central logic circuit connects onto the individual logic under consideration, and takes notice of the condition of the bistables circuit *af* and *cb* through the wires *fl*10 and *fl*12; it concludes that the cam-passing has taken place for the first time and it notes this fact by putting the bistables *ca* in position 1 (wire *fl*16). At the instant *t*4, the information "1" is transmitted onto core *to*5.

As long as the cam-passing period does not take place again, no change whatever happens. Every time the scanner reaches the memory compartment under consideration, a mere reading and writing operation is effected, as in the preceding cases (5th stage of operation, point 5 of FIG. 5).

At the sixth stage of operation, the dialing impulse ends, the calling line is again cut through or looped; and that corresponds to point P6 of FIG. 5. It will be assumed that this impulse ends before the second cam-passing period. When a reading is being made, one notes that the line is looped whereas it was not looped previously (bistable *jt* in 1, bistable *tm* in 0). The central logic circuit is then called through a gate "OR" and a gate "AND" unblocked by the conditions *t*4, *jt*1 and *tm*0.

The central logic circuit stops the cyclical scanning and connects onto the individual circuit under consideration. By means of wires *f*18 and *f*19, it takes notice of the condition of the bistables *tm*, *jt* and thus concludes that the dialing impulse is terminated. It then restores this impulse into the second memory compartment associated with the junctor and assigned to the registering of the numbers. Such an operation offers no particular difficulty; it is only necessary to write in the first memory compartment the number of the second compartment. This number is transferred from the individual logic circuit CLI to the central logic circuit CLC (FIG. 2). The latter may then, through wire *fl*17, direct the scanner EXM onto the said second compartment and start all necessary writing.

By means of wire *fl*18 (FIG. 3) the central logic circuit CLC restores the bistable *ca* to zero, in order to return the time limit device into its initial condition.

In the foregoing description, it was assumed that the end of the dialing occurred before the time limit fixed by the cam CM expired. As has already been mentioned, this time limit can be of 80 milliseconds. If the cam-passing period takes place a second time before the subscriber's line is looped (point P7 of FIG. 5), the central logic circuit is called through the wire MM, the gate "OR" and the gate "AND," unblocked by the conditions *t*4, *af*1, *cb*1. The central logic circuit stops the cyclical scanning, connects onto the individual logic ciruit considered, and takes note of the condition of bistables *af*, *ca*, *cb*, through the wires *fl*10, *fl*11, *fl*12. Since the duration of the breaking of subscriber's line exceeds the duration of the time limit, the central logic circuit deduces that it is not a dialing impulse but a replacing of handset. It commands then, by any adequate means, the release of the feeder and of the associated memory compartments.

If too long a break in the caller's line is interpreted as a replacing of handset, a break too short due to an accidental cause is not taken into consideration because of the self-inductances inserted on the caller's current feeding circuit.

The detecting of an interval between two dialing impulses is effected according to the same process, with the only difference that the operation is performed along a looped line and no longer along an open line. In the case where the loop is interrupted before the second cam-current generating period, the central logic circuit deduces that this is indeed an interval between two dialing impulses; it then prepares the writing of the next impulse on the appropriate core of the registering compartment. Whereas, if the caller's loop persists when the cam-passing takes place for the second time, the logic circuit deduces that this is not an interval between two dialing impulses but actually a pause between digits. It then commands the restoring to the zero condition of the two cores *to*4 and *to*5, and it prepares the reception of the next digit on the appropriate cores of the registering compartment.

A certain lapse of time may take place between calling of the central logic circuit and its connection onto the individual logic circuit. During this interval, the condition of the line may have changed. In order to take into account this eventuality the central logic circuit before making a decision, may request a new reading of the various information; it just has to act upon the gates PT, enabling thus the passage of the impulses *t*0 to *t*4.

According to a variant, it is possible to use a cam non-synchronized with the scanning cycle. Two cams, distanced one as to the other, are then provided. The duration of the first cam-current generating period is slightly superior to the one of the scanning cycle, so as to be sure to find this cam-current generating period at least once, whatever be the compartment scanned; the second cam-passing if it is produced, is not taken into consideration. When, after having noted the first cam-passing the second cam-passing is found, it can be deduced with certainty that there has elapsed, since the last change of line condition, a lapse of time at least equal to the interval between cams.

With an aim of simplifying the text, the elements have not been described here of the central logic circuit co-operating with the individual logic circuit in order to detect the dialing impulses, but they can easily be determined by those in the art as per the foregoing indications—since at every stage of operation there were mentioned with precision the elements of information transmitted to the logic circuit, and the orders which it had to elaborate.

These logic-circuit elements can be realized either by means of a decoding system having diodes or resistors, or by means of a program written on magnetic medium (or tape).

Likewise, all the various equipment shown on FIG. 2 (memories, scanners, address allotters, reading and writing equipment, logic circuits, gates) are of classical nature and can easily be realized as soon as the program to be executed has been determined.

It is understood the foregoing descriptions have been given only as a way of none limiting example, and that many other embodiments are liable to be carried out without leaving the scope of the invention. For instance, the ferrite cores can be replaced by different memories; scanners of a different type can be provided; other time diagrams adopted; etc. In particular, the various numerical data were mentioned only by way of example, in order to facilitate the understanding of the operating process, and are liable to vary with each particular case or installation.

We claim:

1. A dial pulse detector arrangement for use with automatic telephone switching systems comprising a plurality of subscriber lines, a plurality of groups of junctors for use in connecting calling lines to called lines, each of said junctors having current feed means for supplying loop current to calling ones of said lines and called ones of said lines, said current feed means comprising inductor-resistor series network means, gate means attached to the junctions of said inductors and said resistors in said series network for determining loop current flow in said current feed means thereby determining the open loop or closed loop condition of said line, memory block means comprising rows of individual memory elements, individual logic means permanently attached to each of said memory block means for controlling the reading and writing in of information in said memory blocks which information is used for accomplishing the connection of calling and called lines, scanning means for cyclically scanning said rows in said memory block means, certain of said memory elements in said rows indicating particular ones of said junctors, junctor scanning means operated under the control of said individual logic means for scanning the junctors determined by said certain elements in the row of said memory block being scanned, means responsive to said junctor being scanned by said junctor scanner for transmitting a signal to said gate means for opening said gate means, means responsive to the opening of said gate means for transmitting the line condition of said line individual to said junctor being scanned to said individual logic circuit means, means responsive to the receipt of said newly determined line condition information for writing said information into another memory element in said row, means for comparing the newly determined line condition information with information stored in said row indicating the line condition during the previous scan to determine changes in said line condition, said individual logic means further including cam means, said cam means operating to provide recurring pulses of fixed time periods, central logic means operated responsive to determining a change in line condition from a first scan to a second scan for stopping said memory block scanner, for storing the beginning of a cam generated pulse in yet another of said memory elements in said row, and for restarting the cyclical scanning of said memory block scanner, means responsive to the next scan of said row for again determining whether a further change in line condition has occurred, and means responsive to said further change in said line condition during said fixed time period for thereby determining that said change in line condition is caused by a dial pulse.

2. The dial pulse detecting arrangement of claim 1 wherein said cam means comprises a bistable circuit, a mechanical cam for cyclically causing the operation of said bistable circuit from one stable state to another stable state to generate said recurring pulses determining said fixed time period.

3. The dial pulse detecting means of claim 2 wherein means are provided in said individual logic circuit means for causing said individual logic circuit means to communicate with said central logic means responsive to the said indication of a change of line condition, and means in said central logic means for noting said first recurrent pulse stored in said memory means to detect the time duration of the change in line condition.

4. The dial pulse detecting means of claim 3 and control register means common to said group of junctors and operated responsive to signals from said central logic means for causing the one of said junctors associated with said calling line to operate responsive to detected dial pulses to connect said called line to said calling line.

No references cited.

WILLIAM C. COOPER, *Primary Examiner.*